US008631357B2

(12) United States Patent
Little

(10) Patent No.: US 8,631,357 B2
(45) Date of Patent: Jan. 14, 2014

(54) DUAL FUNCTION SCROLL WHEEL INPUT

(75) Inventor: Alexander Harry Little, Woodside, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 13/286,134

(22) Filed: Oct. 31, 2011

(65) Prior Publication Data

US 2013/0111346 A1    May 2, 2013

(51) Int. Cl.
 *G06F 3/033* (2013.01)
(52) U.S. Cl.
 USPC .......................................... 715/863; 715/830
(58) Field of Classification Search
 None
 See application file for complete search history.

(56) References Cited

U.S. PATENT DOCUMENTS

| | | | | |
|---|---|---|---|---|
| 5,402,339 | A * | 3/1995 | Nakashima et al. | 1/1 |
| 6,579,101 | B2 * | 6/2003 | Phan | 434/188 |
| 7,480,870 | B2 | 1/2009 | Anzures et al. | |
| 7,509,588 | B2 | 3/2009 | Van Os et al. | |
| 7,512,549 | B1 * | 3/2009 | Morita et al. | 705/26.1 |
| 7,614,008 | B2 | 11/2009 | Ording | |
| 7,633,076 | B2 | 12/2009 | Huppi et al. | |
| 7,650,137 | B2 | 1/2010 | Jobs et al. | |
| 7,653,883 | B2 | 1/2010 | Hotelling et al. | |
| 7,657,849 | B2 | 2/2010 | Chaudhri et al. | |
| 7,663,607 | B2 | 2/2010 | Hotelling et al. | |
| 7,844,914 | B2 | 11/2010 | Andre et al. | |
| 7,957,762 | B2 | 6/2011 | Herz et al. | |
| 8,006,002 | B2 | 8/2011 | Kalayjian et al. | |
| 8,106,856 | B2 * | 1/2012 | Matas et al. | 345/73 |
| 2002/0174056 | A1 * | 11/2002 | Sefein et al. | 705/37 |
| 2005/0190059 | A1 | 9/2005 | Wehrenberg | |
| 2005/0262450 | A1 * | 11/2005 | Sauermann | 715/784 |
| 2006/0017692 | A1 | 1/2006 | Wehrenberg et al. | |
| 2006/0026521 | A1 | 2/2006 | Hotelling et al. | |
| 2006/0026535 | A1 | 2/2006 | Hotelling et al. | |
| 2006/0026536 | A1 | 2/2006 | Hotelling et al. | |
| 2006/0033724 | A1 | 2/2006 | Chaudhri et al. | |
| 2006/0161870 | A1 | 7/2006 | Hotelling et al. | |
| 2006/0197753 | A1 | 9/2006 | Hotelling | |
| 2007/0152978 | A1 | 7/2007 | Kocienda et al. | |
| 2007/0152980 | A1 | 7/2007 | Kocienda et al. | |
| 2007/0177804 | A1 | 8/2007 | Elias et al. | |
| 2007/0236475 | A1 * | 10/2007 | Wherry | 345/173 |
| 2007/0257890 | A1 | 11/2007 | Hotelling et al. | |
| 2008/0052945 | A1 * | 3/2008 | Matas et al. | 34/173 |
| 2008/0165149 | A1 | 7/2008 | Platzer et al. | |

(Continued)

OTHER PUBLICATIONS

Ryan Johnson, Wake Up Now? Alarm Clock, Apr. 2, 1010.*

*Primary Examiner* — Phenuel Salomon
*Assistant Examiner* — Mahelet Shiberou
(74) *Attorney, Agent, or Firm* — Schwegman Lundberg & Woessner, P.A.

(57) ABSTRACT

A device includes a display screen, at least one processor, memory, and a plurality of programs stored in memory that are configured to be executed by the at least one processor and cause the device to: display, on the display screen, a column of data comprising a plurality of data values; display a selection row that intersects the column of data to indicate a selected data value; detect a first gesture on the column of data; scroll the column of data to change the selected data value in response to detecting the first gesture; detect a second gesture, different from the first gesture, on the column of data; and, when the selected data value has an alternative expression, indicate the alternative expression to the selected data value in response to the second gesture on the column of data.

18 Claims, 11 Drawing Sheets

(56) References Cited

U.S. PATENT DOCUMENTS

2009/0089671 A1* 4/2009 Bliss et al. .................... 715/700
2009/0306955 A1* 12/2009 Begin et al. .................... 703/22
2010/0194759 A1* 8/2010 Hatch .......................... 345/467
2010/0295805 A1* 11/2010 Shin et al. .................... 345/173
2010/0321407 A1* 12/2010 Mital et al. .................... 345/643
2012/0017147 A1* 1/2012 Mark .......................... 715/702

* cited by examiner

DUAL FUNCTION SCROLL WHEEL INPUT

FIELD

The present disclosure relates to a method and device providing a graphic user interface for, e.g., portable electronic devices, and more particularly, to a graphic user interface for selecting from a number of data values in, e.g., portable electronic devices with touch screen displays that display scrollable columns of data.

BACKGROUND

As portable electronic devices become more compact, and the number of functions performed by a given device increase, it has become a significant challenge to design a user interface that allows users to easily interact with a multifunction device. This challenge is particularly significant for handheld portable devices, which have much smaller screens than desktop or laptop computers. This is unfortunate because the user interface is the gateway through which users receive not only content but also responses to user actions or behaviors, including user attempts to access a device's features, tools, and functions. Some portable communication devices (e.g., cell phones, etc.) have resorted to adding more push buttons, increasing the density of push buttons, overloading the functions of push buttons, or using complex menu systems to allow a user to access, store, and manipulate data. These conventional user interfaces often result in complicated key sequences and menu hierarchies that must be memorized by the user.

Many conventional user interfaces, such as those that include physical push buttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired push button, such inflexibility is frustrating to most users.

Portable multifunction devices often include functions or applications that require input of data from a number of set choices, and the choice between equivalents of the set choices. But the existing user interfaces for providing this input (e.g., via stylus, finger, or hard buttons) are cumbersome and inefficient.

Commonly assigned U.S. patent application Ser. No. 11/968,051, "System, Method, and Graphic User Interface for Inputting Date and Time Information on a Portable Multifunction Device," filed Dec. 31, 2007 (now U.S. Published Patent Application No. 2008/0165149), discloses a scroll wheel function greatly improves on the user experience. It does not, however, expressly provide for dual or tertiary functions within each column of information.

Accordingly, there is a perceived need more transparent and intuitive user interfaces for inputting data and choosing equivalents for the data, particularly for but not limited to use in portable multifunction devices. Such interfaces can increase the effectiveness, efficiency, and user satisfaction, particularly with respect to portable multifunction devices.

SUMMARY

In some embodiments, a portable multifunction device has a touch-sensitive display (e.g., a touch screen) with a graphical user interface (GUI), one or more processors, memory, and one or more modules, programs, or sets of instructions stored in the memory for performing multiple functions. In some embodiments, the user interacts with the GUI primarily through finger contacts and gestures on the touch screen. In some embodiments, functions may include telephoning, video conferencing, e-mailing, instant messaging, blogging, digital photographing, digital video recording, web browsing, digital music playing, and digital video playing. Instructions for performing these functions may be included in a computer program product configured for execution by one or more processors.

In one exemplary embodiment, a method is performed including: displaying a column of data comprising a plurality of data values on a display screen; displaying a selection row that intersects the column of data to indicate a selected data value; detecting a first gesture on the column of data; scrolling the column of data to change the selected data value in response to detecting the first gesture on the column of data; detecting a second gesture, different from the first gesture, on the column of data; and, when the selected data value has an alternative expression, indicating the alternative expression of the selected data value in response to detecting the second gesture on the column of data.

In one exemplary embodiment, a device includes: a display screen, at least one processor, memory, and a plurality of programs stored in memory that are configured to be executed by the at least one processor and cause the device to: display, on the display screen, a column of data comprising a plurality of data values; display a selection row that intersects the column of data to indicate a selected data value; detect a first gesture on the column of data; scroll the column of data to change the selected data value in response to detecting the first gesture; detect a second gesture, different from the first gesture, on the column of data; and, when the selected data value has an alternative expression, indicate the alternative expression to the selected data value in response to the second gesture on the column of data.

In one exemplary embodiment, a graphical user interface on a device with a display screen includes: a column of data comprising a plurality of data values and a selection row that intersects the column of data to indicate a selected data value, wherein in response to detecting a first gesture on the column of data, the column of data is scrolled to change the selected data value, and, when the selected data value has an alternative expression, indicating the alternative expression of the selected data value in response to detecting a second gesture, different from the first gesture, on the column of data.

In one exemplary embodiment, a non-transitory computer readable medium has a program stored therein that causes a processor of a device with a display screen to: display, on the display screen, a column of data comprising a plurality of data values; display a selection row that intersects the column of data to indicate a selected data value; detect a first gesture on the column of data; scroll the column of data to change the selected data value in response to detecting the first gesture; detect a second gesture, different from the first gesture, on the column of data; and, when the selected data value has an alternative expression, indicate the alternative expression to the selected data value in response to the second gesture on the column of data.

BRIEF DESCRIPTION OF THE DRAWING FIGURES

Figure 1A:
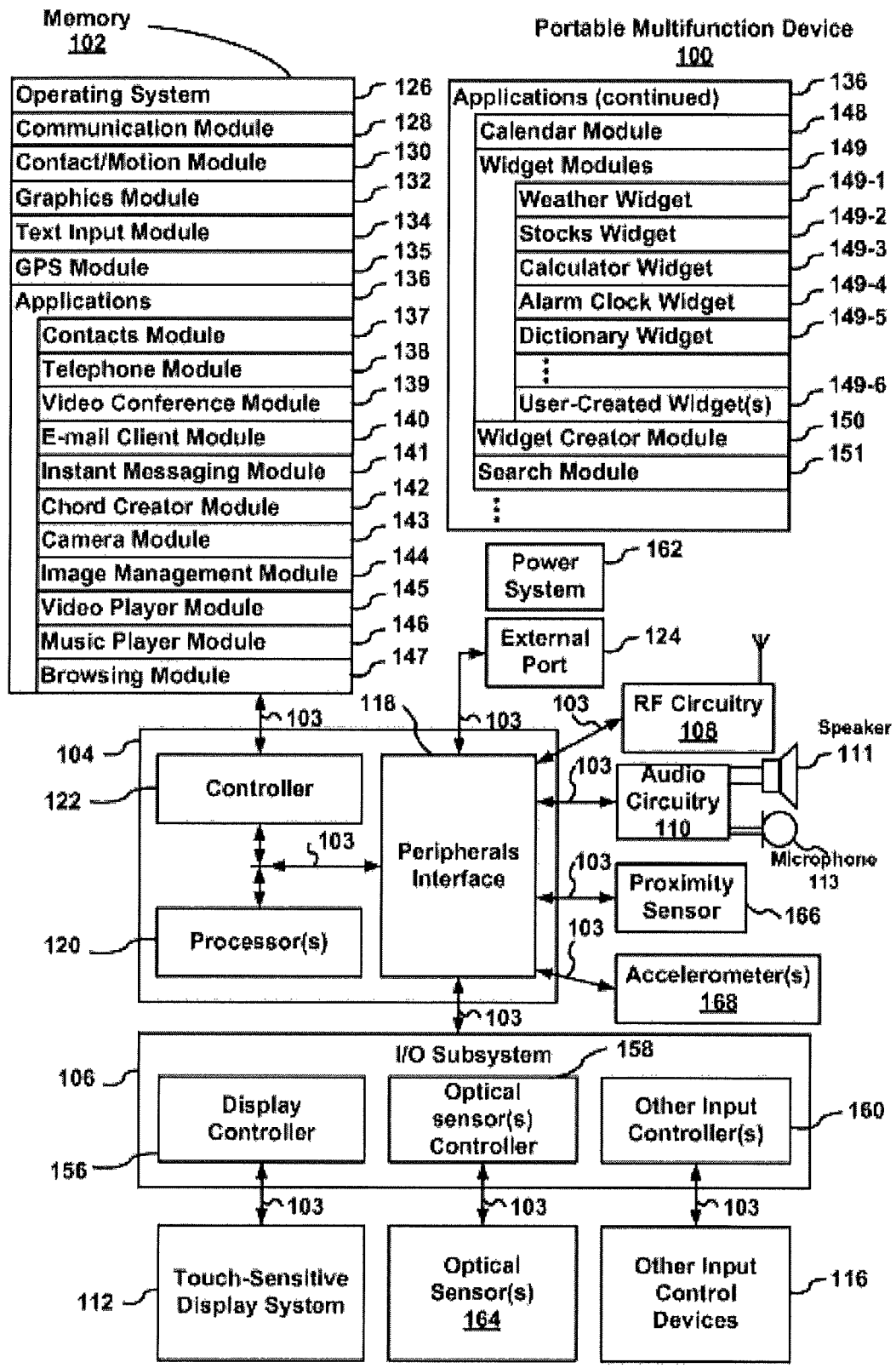
FIGS. 1A and 1B are block diagrams illustrating portable multifunction devices with touch-sensitive displays in accordance with some embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

Embodiments of a portable multifunction device, user interfaces for such devices, and associated processes for using such devices are described. In some embodiments, the device is a portable communications device such as a mobile telephone that also contains other functions, such as personal digital assistant (PDA) functions or music player functions.

The user interface may include a physical click wheel in addition to a touch screen or a virtual click wheel displayed on the touch screen. A click wheel is a user interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to a selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user interface devices, such as a physical click wheel, physical keyboard, a mouse, and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006 (now U.S. Patent Publication No. 2007/0152978), and Ser. No. 11/459,615, "Touch Screen Keyboards For Portable Electronic Devices," filed Jul. 24, 2006 (now U.S. Patent Publication No. 2007/0152980), the contents of which are hereby incorporated by reference herein in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
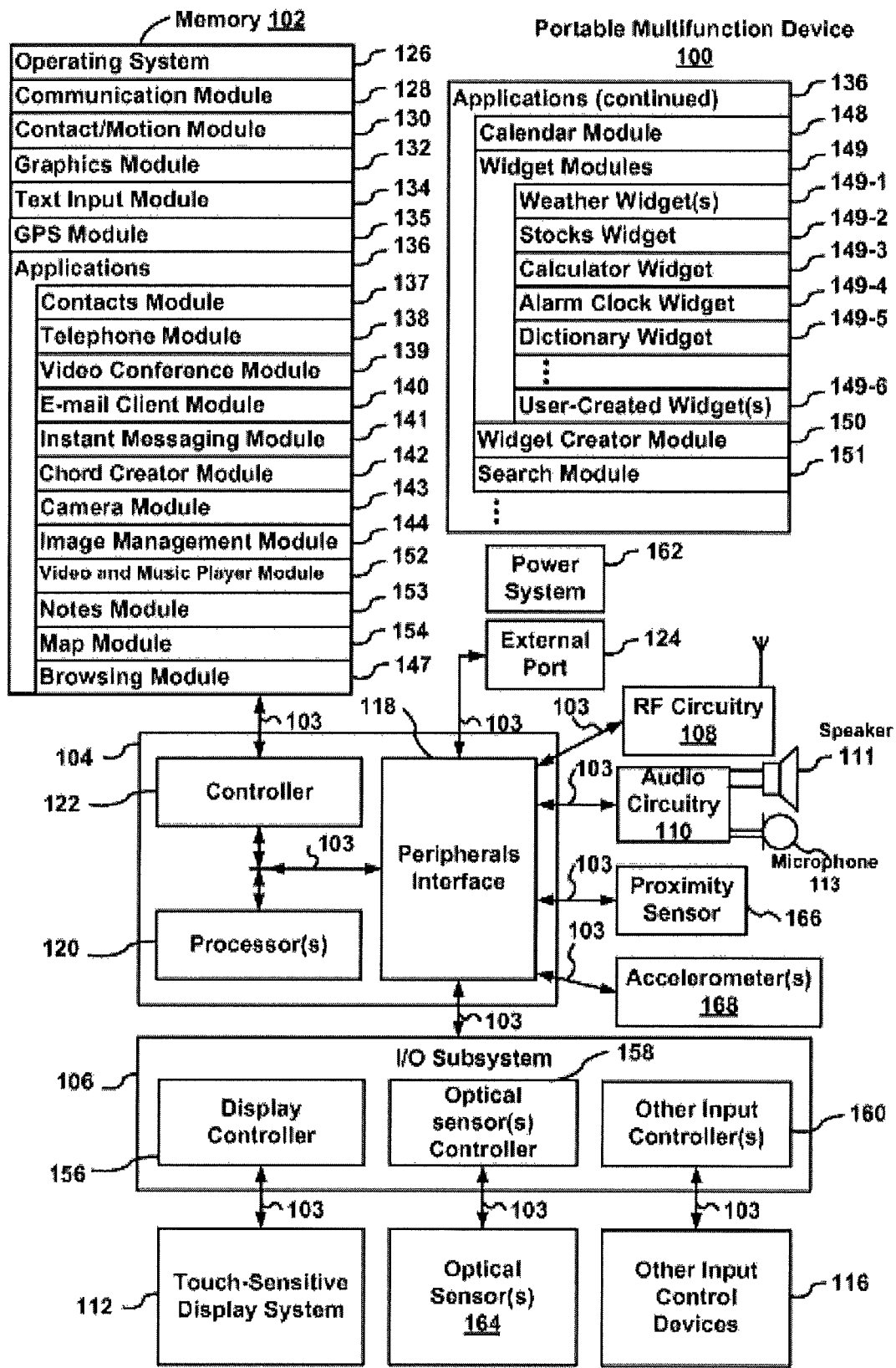

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005 (now issued U.S. Pat. No. 7,657,849), which is hereby incorporated by reference herein in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be as described in the following applications: (1) U.S. patent application Ser. No. 11/381,313, "Multipoint Touch Surface Controller," filed May 2, 2006 (now U.S. Published Patent Application No. 2007/0257890); (2) U.S. patent application Ser. No. 10/840,862, "Multipoint Touchscreen," filed May 6, 2004 (now issued U.S. Pat. No. 7,663,607); (3) U.S. patent application Ser. No. 10/903,964, "Gestures For Touch Sensitive Input Devices," filed Jul. 30, 2004 (now U.S. Published Patent Application No. 2006/0026521); (4) U.S. patent application Ser. No. 11/048,264, "Gestures For Touch Sensitive Input Devices," filed Jan. 31, 2005 (now U.S. Published Patent Application No. 2006/0026536); (5) U.S. patent application Ser. No. 11/038,590, "Mode-Based Graphical User Interfaces For Touch Sensitive Input Devices," filed Jan. 18, 2005 (now U.S. Published Patent Application No. 2006/0026535); (6) U.S. patent application Ser. No. 11/228,758, "Virtual Input Device Placement On A Touch Screen User Interface," filed Sep. 16, 2005 (now U.S. Published Patent Application No. 2006/0033724); (7) U.S. patent application Ser. No. 11/228,700, "Operation Of A Computer With A Touch Screen Interface," filed Sep. 16, 2005 (now issued U.S. Pat. No. 7,614,008); (8) U.S. patent application Ser. No. 11/228,737, "Activating Virtual Keys Of A Touch-Screen Virtual Keyboard," filed Sep. 16, 2005 (now issued U.S. Pat. No. 7,844,914); (9) U.S. patent application Ser. No. 11/367,749, "Multi-Functional Hand-Held Device," filed Mar. 3, 2006 (now U.S. Published Patent Application No. 2006/0197753); (10) U.S. patent application Ser. No. 11/968,051, "System, Method, and Graphic User Interface for Inputting Date and Time Information on a Portable Multifunction Device," filed Dec. 31, 2007 (now U.S. Published Patent Application No. 2008/0165149); and (11) U.S. patent application Ser. No. 13/286,145, "System and Method for Generating Customized Chords," by inventors Alexander H. Little and Eli T. Manjarrez, filed Oct. 31, 2011. All of these applications are incorporated by reference herein in their entirety.

The touch screen 112 may have a resolution in excess of 100 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the optical sensor 164 of FIG. 4B (described in more detail below) can be used to input gestures that are seen if the multifunction device is in a mode for gesture recognition using computer vision based on hand gestures, can be based on facial gestures or body pose, as is known in the art. This might be augmented by depth aware cameras, stereo cameras and/or devices such as stylists or wired gloves, as just a few examples. Further input mechanisms include using a built in magnetometer and/or proximity sensor 166. Further, input may be made though verbal commands via the microphone 113, and/or by shaking the device via accelerometer 168, for instance.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for gesture recognition and/or videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005 (now issued U.S. Pat. No. 7,653,883); Ser. No. 11/240,788 "Proximity Detector In Handheld Device," filed Sep. 30, 2005 (now U.S. Patent Publication No. 2006/0161870); Ser. No. 11/620,702, "Using Ambient Light Sensor To Augment Proximity Sensor Output," filed Jan. 7, 2007 (now issued U.S. Pat. No. 7,957,762); Ser. No. 11/586,862, "Automated Response To And Sensing Of User Activity In Portable Devices," filed Oct. 24, 2006 (now issued U.S. Pat. No. 7,633,076); and Ser. No. 11/638,251, "Methods And Systems For Automatic Configuration Of Peripherals," filed Dec. 12, 2006 (now issued U.S. Pat. No. 8,006,002), which are hereby incorporated by reference herein in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 2005/0190059, "Acceleration-based Theft Detection System for Portable Electronic Devices," and U.S. Patent Publication No. 2006/0017692, "Methods And Apparatuses For Operating A Portable Device Based On An Accelerometer," both of which are which are incorporated by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion/gesture detection module 130 may detect contact with the touch screen 112 (in conjunction with the display controller 156) and other touch sensitive or non-contact gesture detection devices (e.g., a touchpad, physical click wheel, optical, motion or proximity detection). The contact/motion module 130 includes various software components for performing various operations related to detection of contact, such as determining if contact has occurred, determining if there is movement of the gesture and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143, as picture/video metadata, and to applications that provide location-based services such as weather widgets, local yellow page widgets, and map/navigation widgets).

The applications 136 may include any or all, or more of the following modules (or sets of instructions), or a subset or superset thereof: a contacts module 137 (sometimes called an address book or contact list); a telephone module 138; a video conferencing module 139; an e-mail client module 140; an instant messaging (IM) module 141; a chord creator module 142; a camera module 143 for still and/or video images; an image management module 144; a video player module 145; a music player module 146; a browser module 147; a calendar module 148; widget modules 149, which may include weather widget 149-1, stocks widget 149-2, calculator widget 149-3, alarm clock widget 149-4, dictionary widget 149-5, and other widgets obtained by the user, as well as user-created widgets 149-6; widget creator module 150 for making user-created widgets 149-6; search module 151; video and music player module 152, which merges video player module 145 and music player module 146; notes module 153; and/or map module 154.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants. Embodiments of user interfaces and associated processes using videoconferencing module 139 are described further below.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS). Embodiments of user interfaces and associated processes using instant messaging module 141 are described further below.

In conjunction with RF circuitry 108, audio circuitry 110, speaker 111, touch screen 112, display controller 156, contact module 130, graphics module 132, and image management module 144, the chord creator module 142 may be used to create sets of chords for chord-based musical instruments. Embodiments of user interfaces and associated processes using chord creator 142 are described further below.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102. Embodiments of user interfaces and associated processes using camera module 143 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124). Embodiments of user interfaces and associated processes using video player module 145 are described further below.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.). Embodiments of user interfaces and associated processes using music player module 146 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.). Embodiments of user interfaces and associated processes using calendar module 148 are described further below.

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget). Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms). Embodiments of user interfaces and associated processes using search module 151 are described further below.

In conjunction with touch screen 112, display controller 156, contact module 130, graphics module 132, and text input module 134, the notes module 153 may be used to create and manage notes, to do lists, and the like. Embodiments of user interfaces and associated processes using notes module 153 are described further below.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data). Embodiments of user interfaces and associated processes using map module 154 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise rearranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
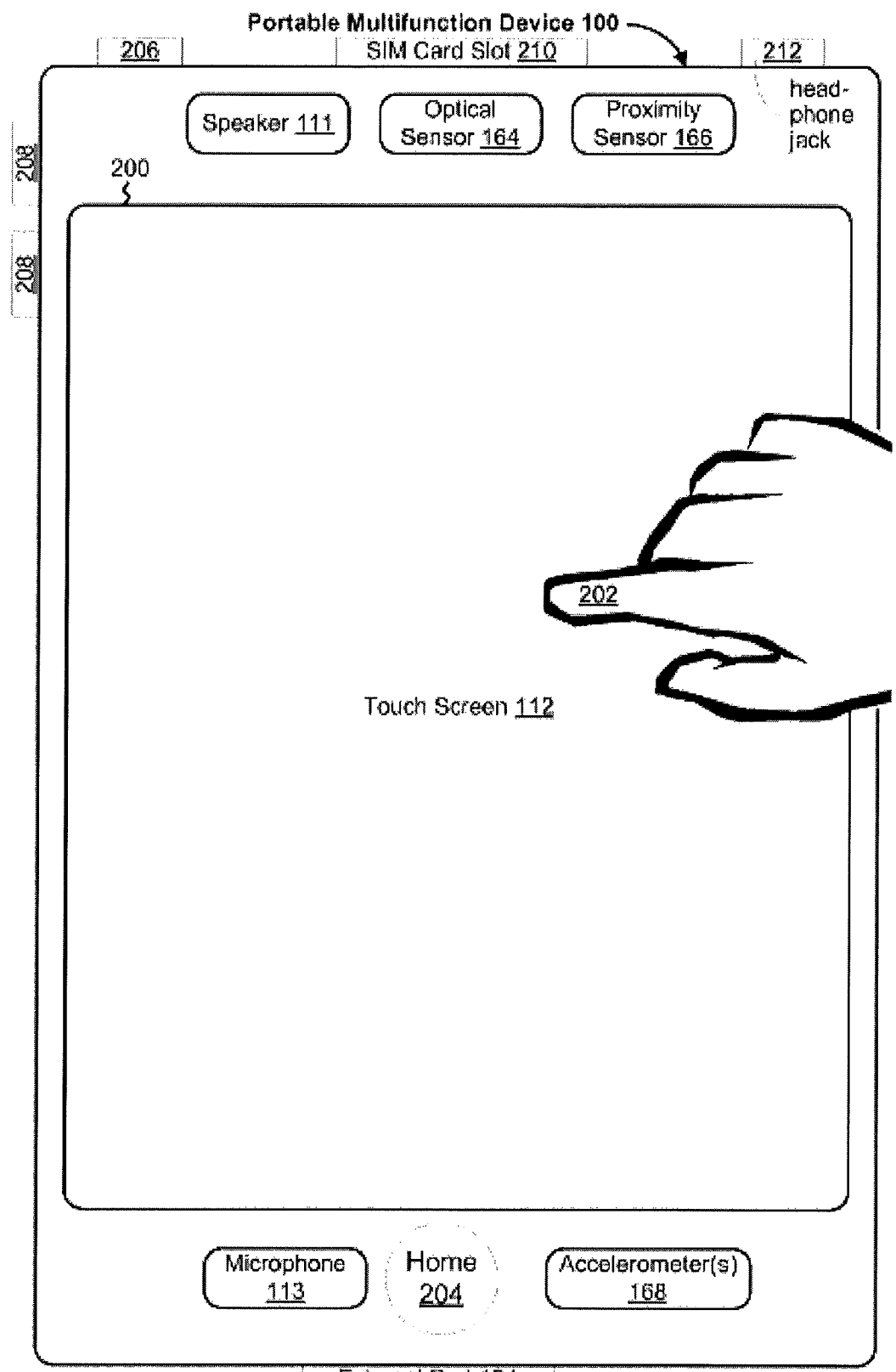
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
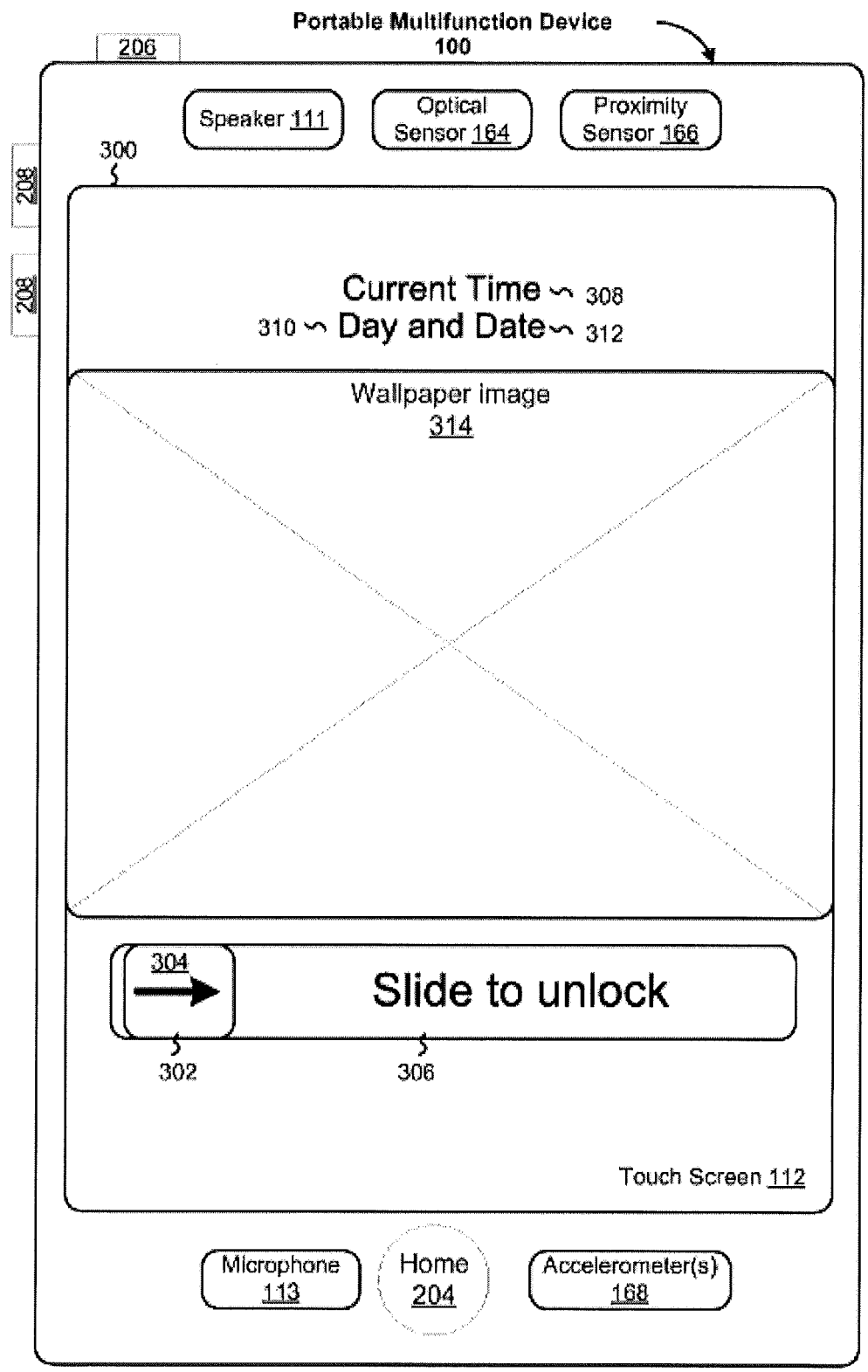
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof: Unlock image 302 that is moved with a finger gesture to unlock the device; Arrow 304 that provides a visual cue to the unlock gesture; Channel 306 that provides additional cues to the unlock gesture; Time 308; Day 310; Date 312; and Wallpaper image 314, as examples.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005 (now issued U.S. Pat. No. 7,657,849), and Ser. No. 11/322,550, "Indication Of Progress Towards Satisfaction Of A User Input Condition," filed Dec. 23, 2005 (now issued U.S. Pat. No. 7,480,870), which are hereby incorporated by reference herein in their entirety.

Figure 4A:
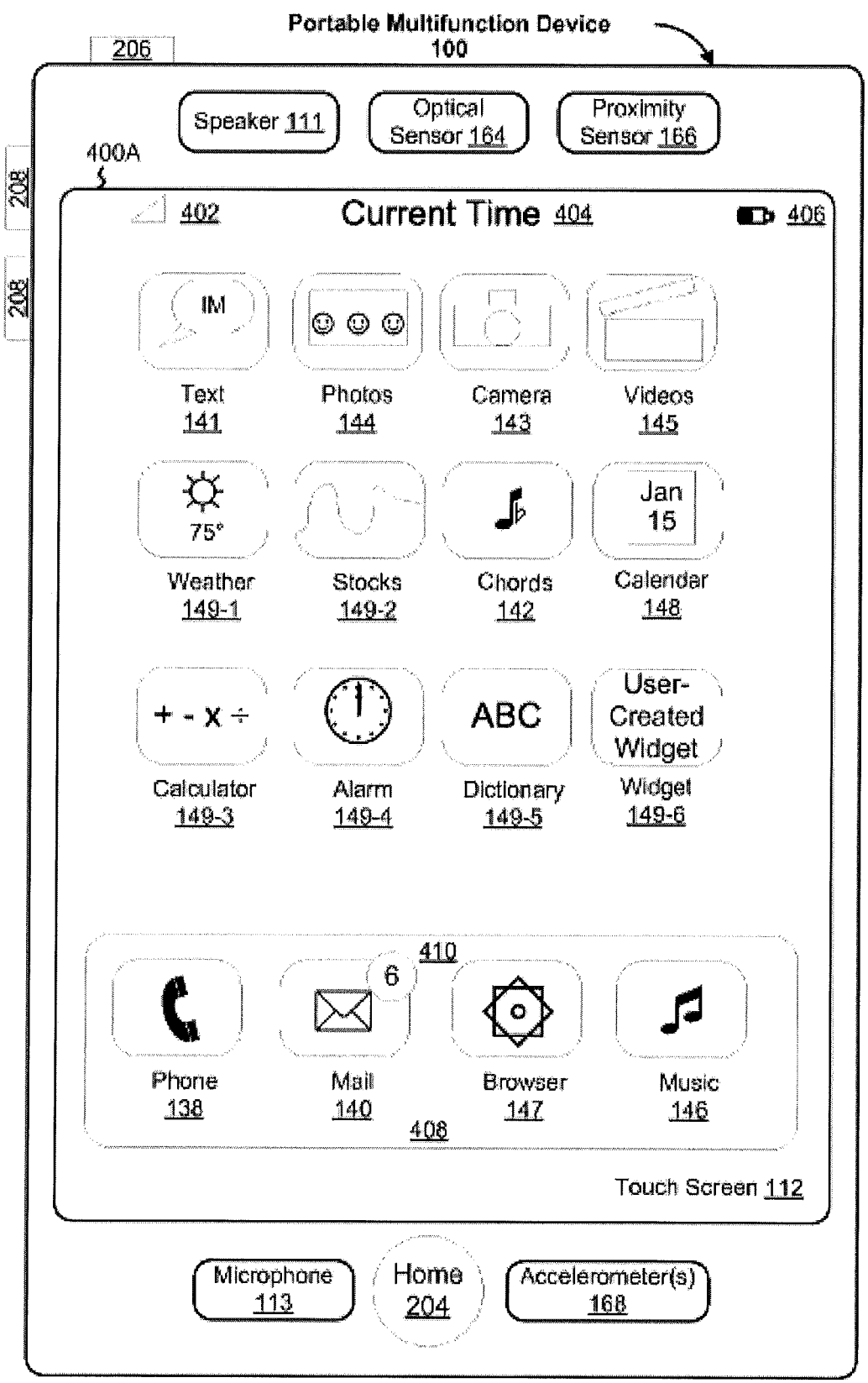
FIGS. 4A and 4B illustrate exemplary user interfaces for a menu of applications on a portable multifunction device in accordance with some embodiments.
Figure 4B:
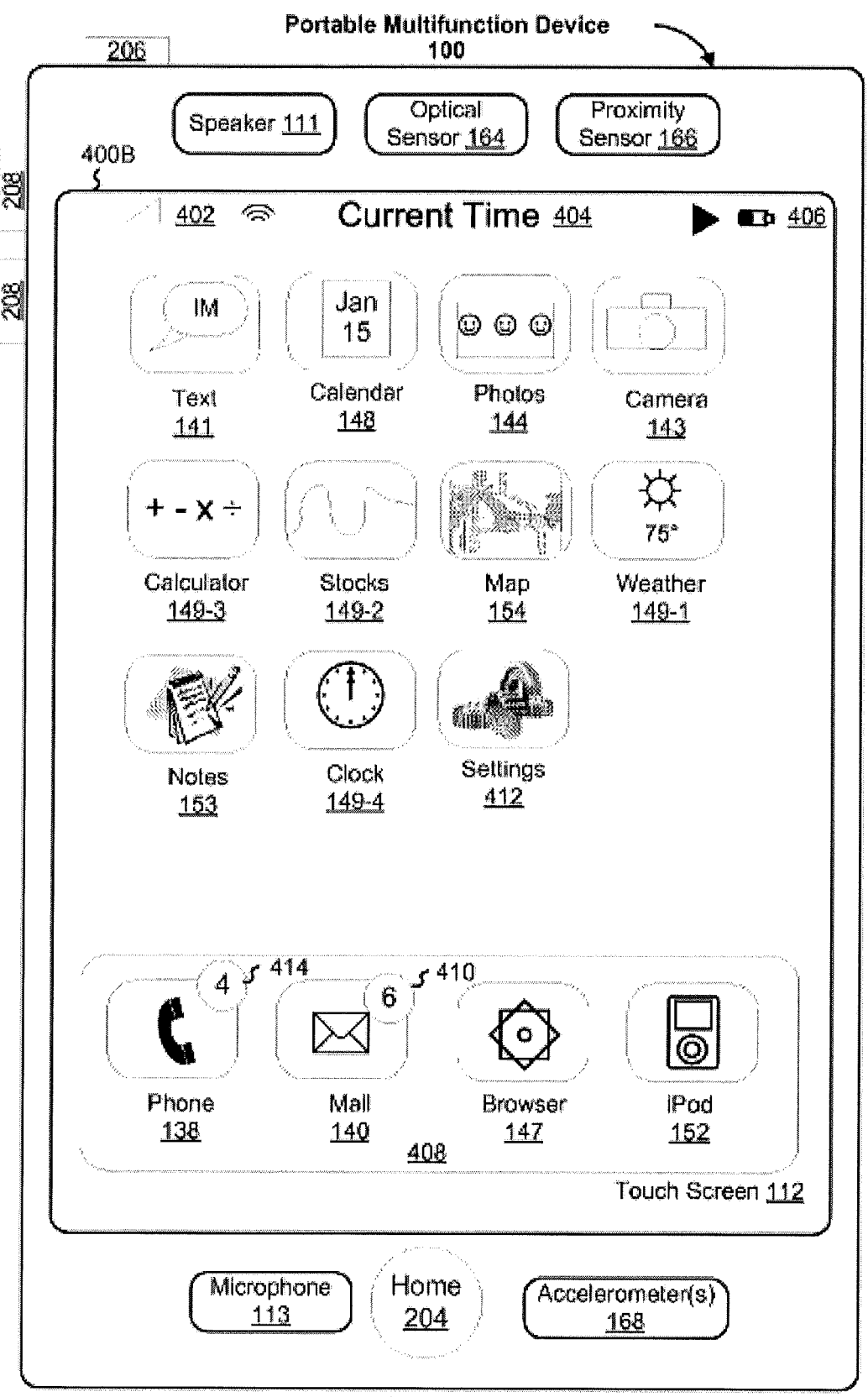

FIGS. 4A and 4B illustrate exemplary user interfaces for a menu of applications on a portable multifunction device in accordance with some embodiments. In some embodiments, user interface 400A includes the following elements, or a subset or superset thereof: Signal strength indicator(s) 402 for wireless communication(s), such as cellular and Wi-Fi signals; Time 404; Battery status indicator 406; Tray 408 with icons for frequently used applications, such as one or more of the following: Phone 138, which may include an indicator 414 of the number of missed calls or voicemail messages; E-mail client 140, which may include an indicator 410 of the number of unread e-mails; Browser 147; Music player 146 as examples; and Icons for other applications, such as one or more of the following: IM 141; Image management 144; Camera 143; Video Player 145; Weather 149-1; Stocks 149-2; Chords 142; Calendar 148; Calculator 149-3; Alarm Clock 149-4; Dictionary 149-5; and User-created widget 149-6, as examples.

In some embodiments, user interface 400B includes the following elements, or a subset or superset thereof: 402, 404, 406, 141, 148, 144, 143, 149-3, 149-2, 149-1, 149-4, 410, 414, 138, 140, and 147, as described above; Map 154; Notes 153; Settings 412, which provides access to settings for the device 100 and its various applications 136, as described further below; and Video and must player module 152, also referred to as iPod (trademark of Apple Computer, Inc.) module 152.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006 (now issued U.S. Pat. No. 7,509,588), which is hereby incorporated by reference herein in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005 (now issued U.S. Pat. No. 7,650,137), which is hereby incorporated by reference herein in its entirety.

Figure 5A:
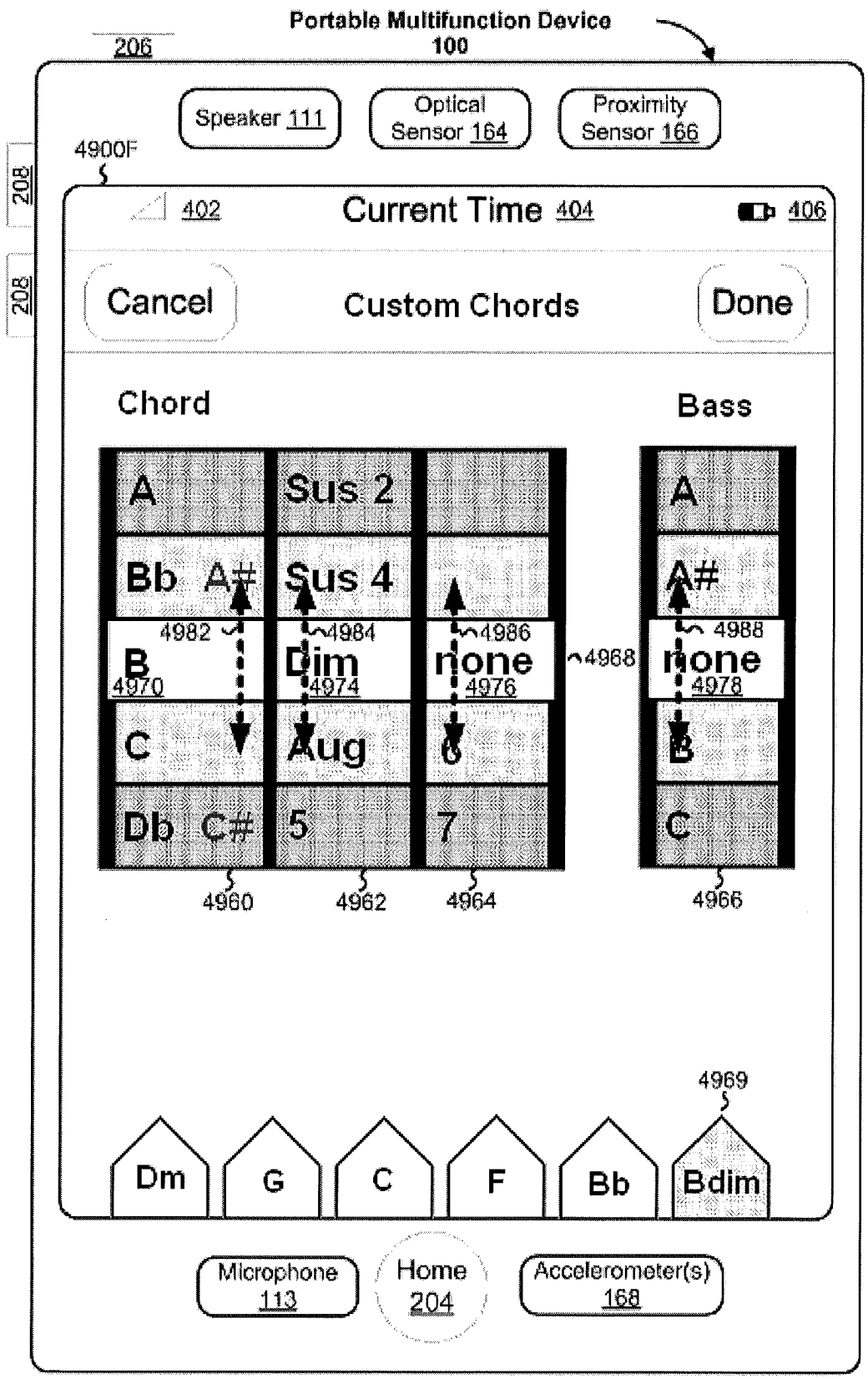
FIGS. 5A-5C illustrate exemplary user interfaces including a dual function scroll wheel input in accordance with some embodiments.
Figure 5B:
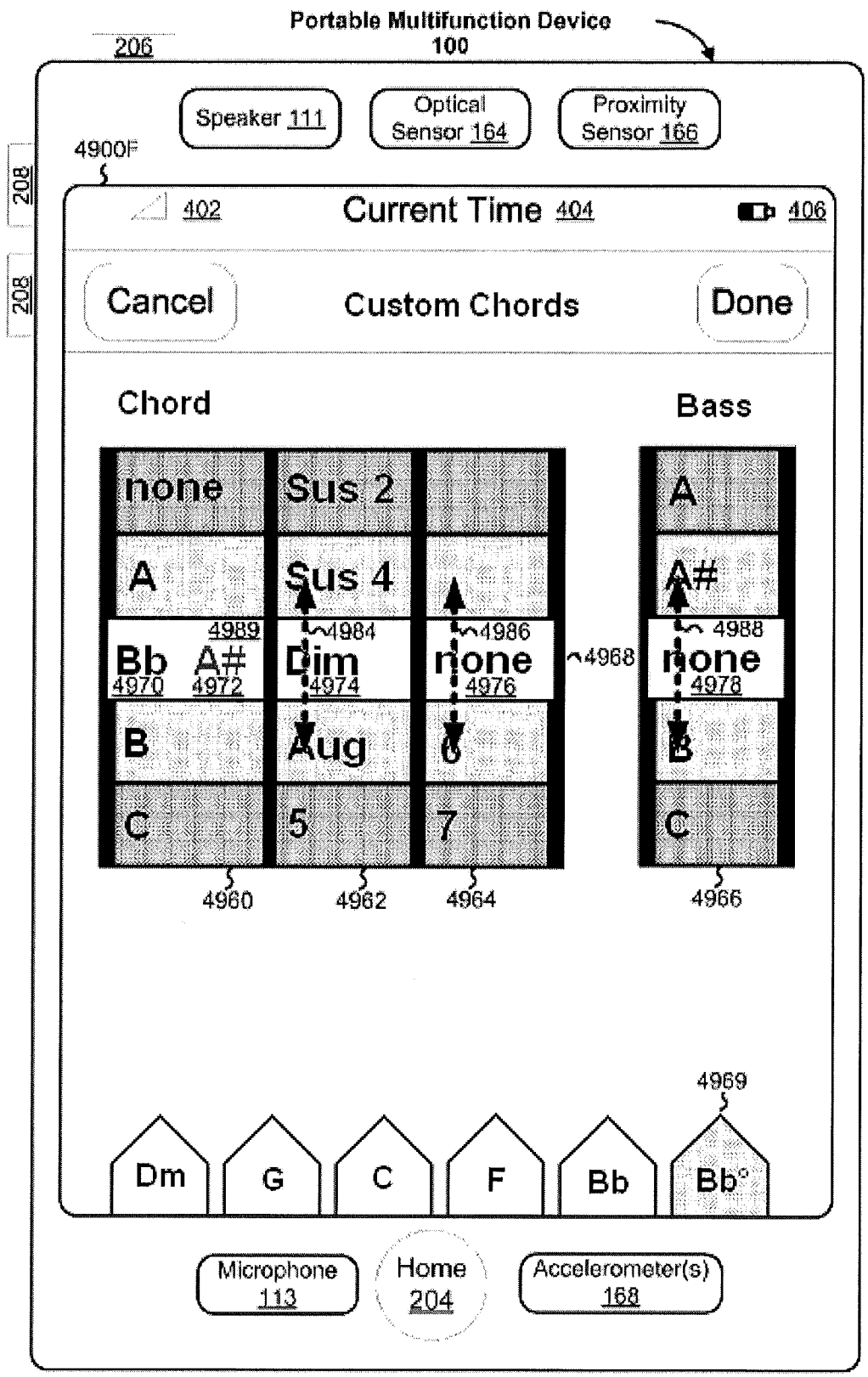
Figure 5C:
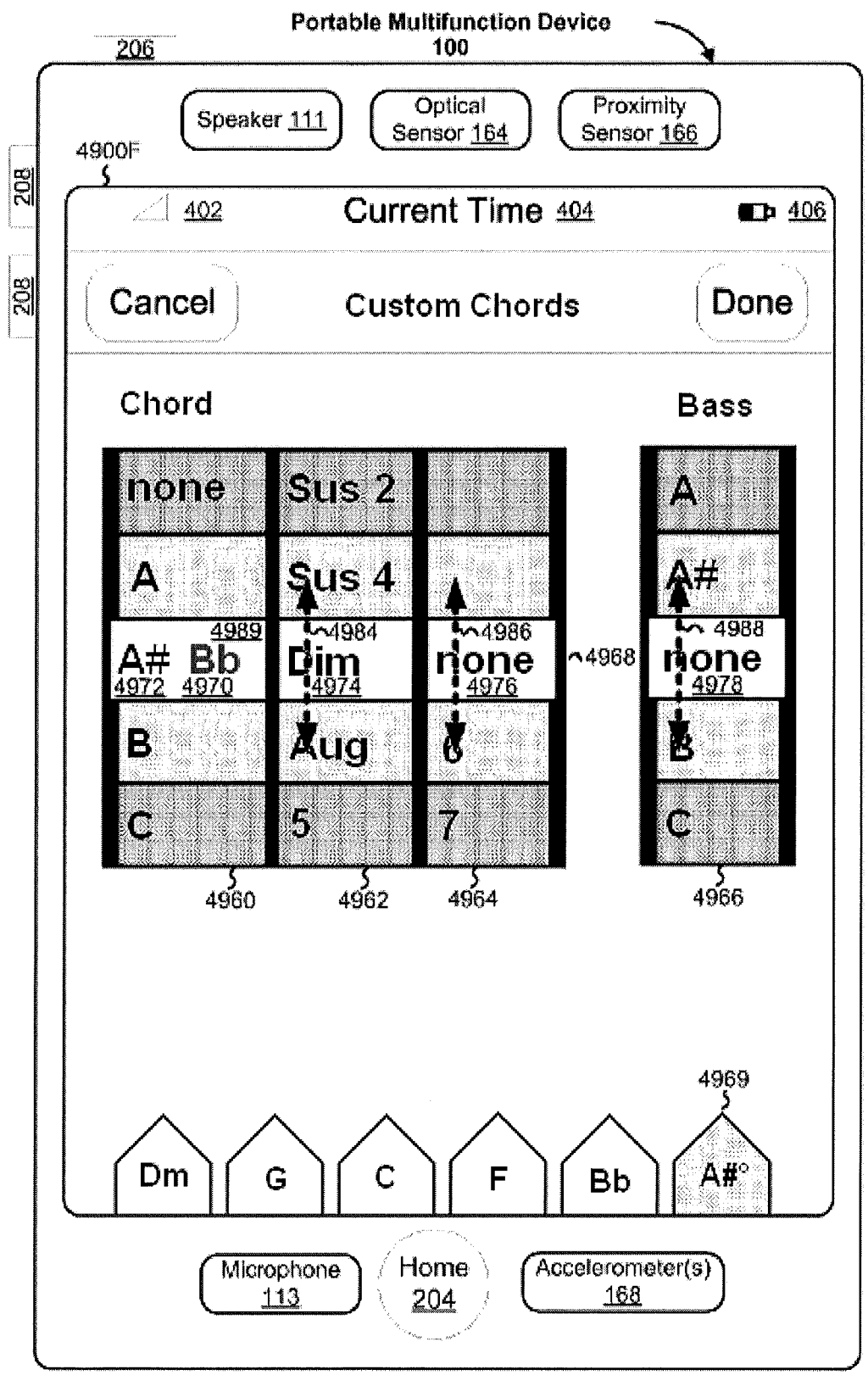

FIGS. 5A-5C illustrate exemplary user interfaces for a chord creator that include a dual function scroll wheel input in accordance with some embodiments.

In some embodiments, the use of chord and/or bass wheels simplify the input and display of musical chords using finger gestures on a touch screen display (e.g., FIGS. 5A-5C). The manner of creating cords is more fully explained in U.S. patent application Ser. No. 13/286,145, "System and Method for Generating Customized Chords," by inventors Alexander H. Little and Eli T. Manjarrez, filed Oct. 31, 2011, and in U.S. Published Patent Application No. 2007/0177804, "Multi-Touch Gesture Dictionary," published Aug. 2, 2007, for example.

Figure 6:
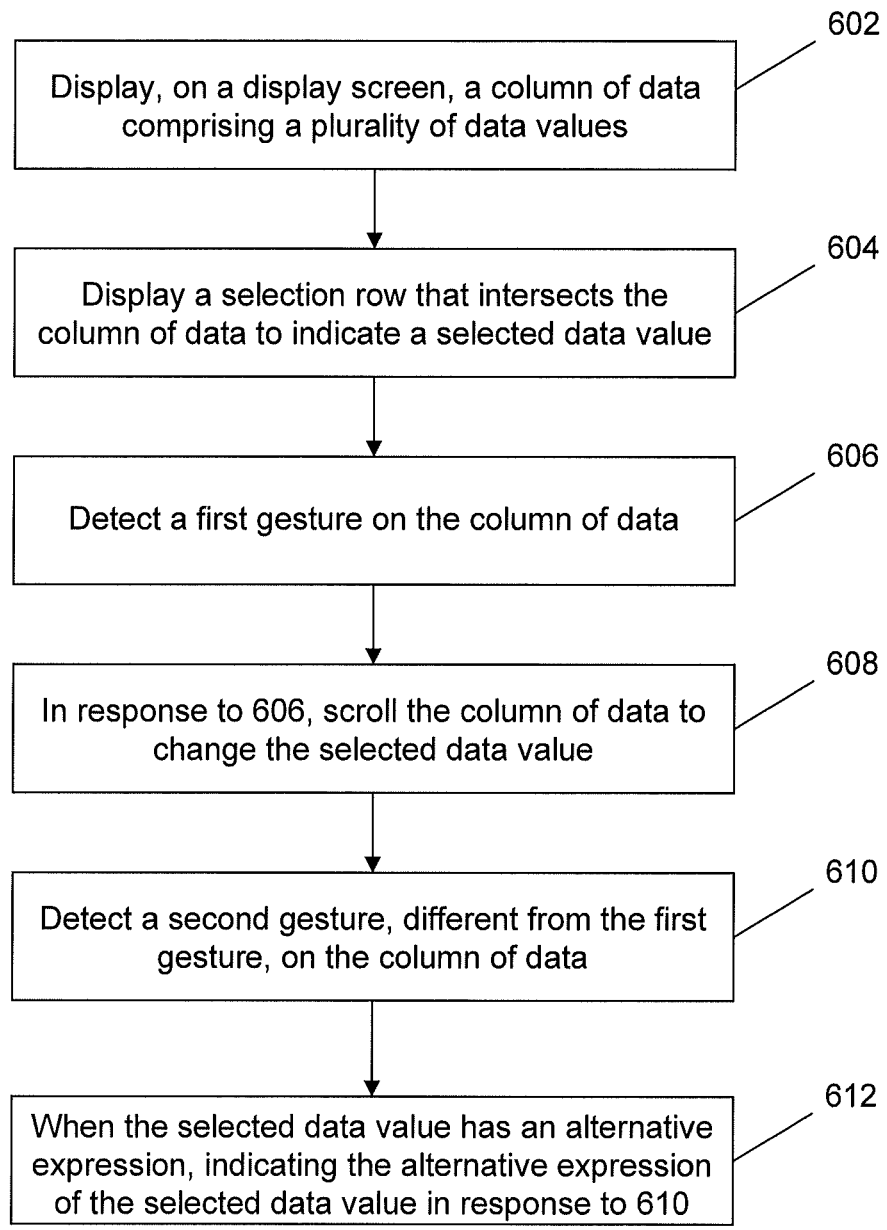
FIG. 6 is a flow diagram illustrating a method of input on a portable multifunction device using a dual function scroll wheel input in accordance with some embodiments.

FIG. 6 is a flow diagram illustrating a process 600 for using a dual function scroll wheel input in accordance with some embodiments.

In some embodiments, a portable multifunction device (e.g., device 100) with a touch screen display (e.g., display 112) displays: a root note column (e.g., column 4960, FIG. 5A) comprising a sequence of root note selections; a gender column (e.g., column 4962) comprising a sequence of chord gender selections; an extension column (e.g., column 4964) comprising a sequence of chord extension selections; a bass column (e.g., column 4966) comprising a sequence of alternate bass note selections; and a selection row (e.g., row 4968) that intersects the root note, gender, extension, and bass columns and contains a single root note selection 4970, gender selection 4974, extension selection 4976, and bass note selection 4978. The touch screen display 112 also displays a chord identifier 4969 that reflects the root note 4970, gender 4974, and extension selection 4976 in the selection row 4968.

A column of data (e.g., root note column 496) comprising a plurality of data values (e.g., root note selection 4970) is displayed (602). A selection row (e.g., selection row 4968) that intersects the column of data to indicate a selected data value (e.g., root note selection 4970) is also displayed (604). A first gesture (e.g., gesture 4982) is detected (606) on the column of data. In some embodiments, the gesture is a finger gesture. In some embodiments, the gesture on the column of data is a substantially vertical swipe. In some embodiments, the gesture on the column of data is a substantially vertical gesture on or near the column of data. In some embodiments, the gesture is detected by a non-contact detector either alternatively or in addition to the touch screen.

In response to detecting the first gesture on the column of data, the column of data is scrolled to change the selected data value (608), as illustrated by FIG. 5B where root note selection 4970 has changed from B to Bb following the gesture 4982. Chord identifier 4969 has also been changed to reflect the changed root note selection 4970. In some embodiments, the plurality of data values in the column of data form a continuous loop.

A second gesture, different from the first gesture, (e.g., gesture 4989) is detected on the column of data (610). In some embodiments, the gesture is a finger gesture. In some embodiments, the gesture on the column of data is a tap on the touch screen display 112. In some embodiments, the gesture is detected by a non-contact detector, as explained above.

In some embodiments, the selected data value has an alternative expression (e.g., alternative root note expression 4972). If there is an alternative expression for the selected data value, it is indicated in response to detecting the second gesture on the column of data (612), as illustrated in FIG. 5C where alternative root note expression 4972 is indicated. In some embodiments, the alternative expression of the selected data value is displayed adjacent to the selected data value, and in response to detecting the second gesture on the column of data, an indication between the alternative expression and the selected data value is toggled. In some embodiments, the alternative expression to the selected value has a data value equivalent to the selected data value (e.g., selected musical note Bb and alternative expression A#, etc.). In some embodiments, the selected data value is a musical note symbol of one form, and the alternative expression of the selected data value is a musical note symbol of another form (e.g., root note selection 4970 and alternative root note expression 4972 of FIGS. 5B and 5C). In another embodiment, the selected data value is a number formatted as a decimal, and the alternative expression of the selected value is the number formatted as a percentage. In another embodiment, the selected data value is a number formatted as a decimal and the alternative expression of the selected data value is the number formatted as points (e.g., for loan approval).

In some embodiments, there may be a plurality (2, 3 or more) of alternative expressions for a selected data value. In one embodiment for instance, the selected data value may be a number formatted as a decimal, with a first alternative expression of the selected data value being the number formatted as a percentage, and a second alternative expression of the selected data value being the number formatted as a fraction. In some embodiments, the alternative expressions for a selected data value are displayed only when the selected data value is in the selection row. In other embodiments, an alternative expression for the selected data value is not displayed until the second gesture on the column of data has been detected.

Figure 7:
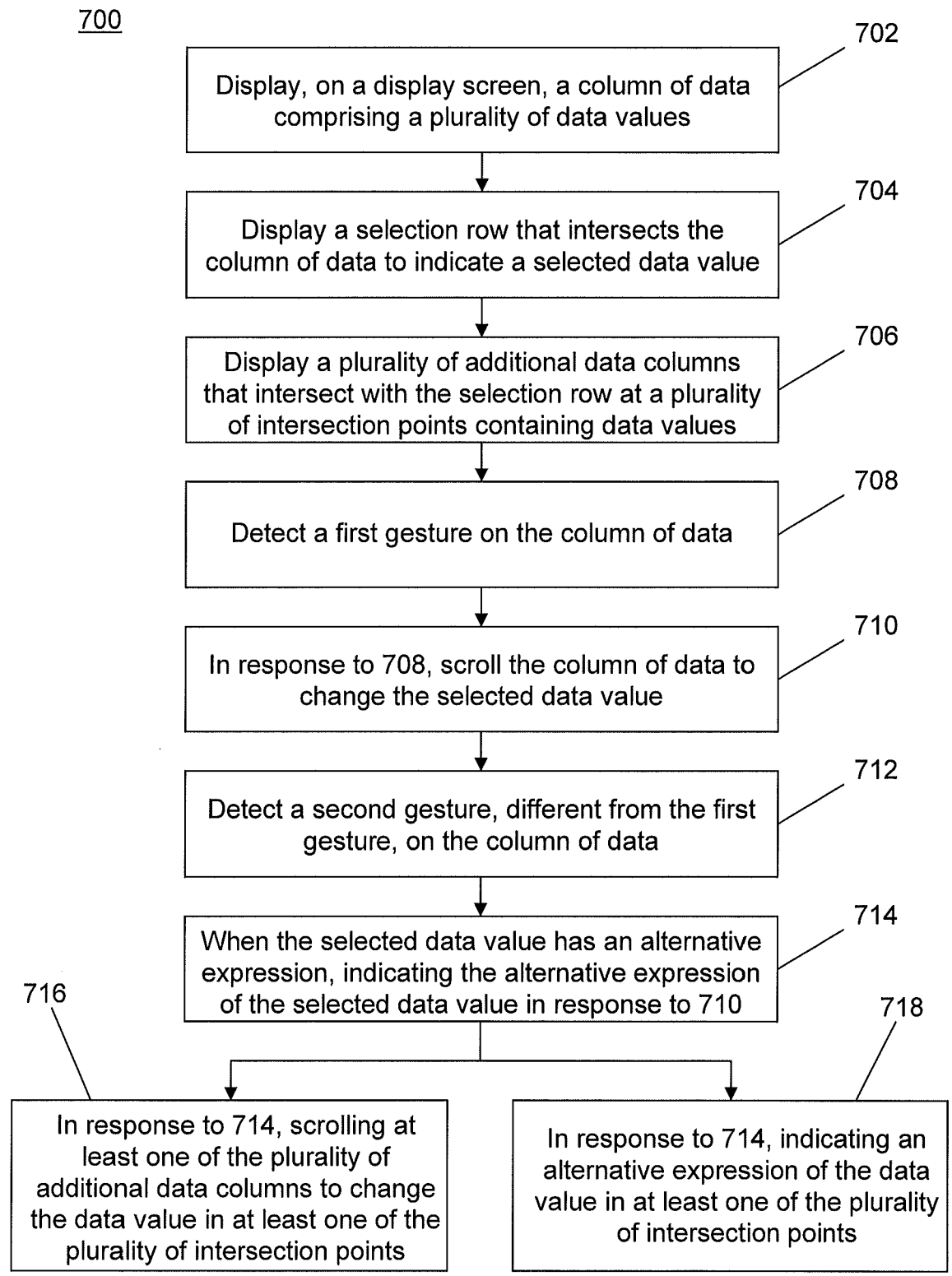
FIG. 7 is a flow diagram illustrating a method of input on a portable multifunction device using a dual function scroll wheel input in accordance with other embodiments.

FIG. 7 is a flow diagram illustrating a process 700 for using a dual function scroll wheel input in accordance with some embodiments.

A column of data (e.g., column 4960) comprising a plurality of data values (e.g., root note selection 4970) is displayed (702). A selection row (e.g., row 4968) that intersects a column of data to indicate a selected data value is also displayed (704). There is also displayed a plurality of additional data columns (e.g., columns 4962 and 4964) that intersect the selection row at a plurality of intersection points containing data values (e.g., gender selection 4974 and extension selection 4976) (706).

A first gesture (e.g., gesture 4982) is detected (708) on the column of data. In some embodiments, the gesture is a finger gesture. In some embodiments, the gesture on the column of data is a substantially vertical swipe. In some embodiments, the gesture on the column of data is a substantially vertical gesture on or near the column of data. In some embodiments, the gesture is detected by a non-contact detector.

In response to detecting the first gesture on the column of data, the column of data is scrolled to change the selected data value (710), as illustrated by FIG. 5B where root note selection 4970 has changed from B to Bb following the gesture 4982. Chord identifier 4969 has also been changed to reflect the changed root note selection 4970. In some embodiments, the plurality of data values in the column of data form a continuous loop.

A second gesture, different from the first gesture, (e.g., gesture 4989) is detected on the column of data (712). In some embodiments, the gesture is a finger gesture. In some embodiments, the gesture on the column of data is a tap on the touch screen display 112. In some embodiments, the gesture is detected by a non-contact detector.

If there is an alternative expression for the selected data value, it is indicated in response to detecting the second gesture on the column of data (714), as illustrated in FIG. 5C where alternative root note expression 4972 (an alternative expression for the root note selection 4970) is indicated. In some embodiments, in response to the indication of the alternative expression for the selected data value, at least one of the plurality of additional data columns is scrolled to change the data value in at least one of the plurality of intersection points (716). In some embodiments, in response to the indication of the alternative expression for the selected value, an alternative expression for a data value in at least one of the plurality of intersection points is indicated (718).

Where methods described above indicate certain events occurring in certain orders, the ordering of certain events may be modified. Moreover, while a process depicted as a flowchart, block diagram, etc. may describe the operations of the system in a sequential manner, it should be understood that the processes' operations can occur in a varying order. For example, although the process 600 is disclosed as being configured to detect a first gesture on the column of data and scroll the column of data prior to detecting a second gesture on the column of data and indicating an alternative expression, in some embodiments, the second gesture can be detected and alternative expression indicated before the first gesture is detected and column of data scrolled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Modifications and variations are possible in light of the above teachings or may be acquired from practicing of the disclosure, without departing from the breadth or scope. The scope of the invention is defined by the claims and their equivalents.

What is claimed is:
1. A method, comprising:
displaying, on a display screen, a plurality of data columns, respective columns of the plurality of data columns comprising a plurality of data values;
displaying a selection row that intersects the plurality of data columns to indicate a plurality of selected data values, respective data values of the plurality of selected data values corresponding to the respective columns;
detecting a first gesture on a particular one of the plurality of data columns;
in response to detecting the first gesture on the particular data column, scrolling the particular data column to change a particular one of the plurality of selected data values corresponding to the particular data column;
detecting a second gesture, the second gesture being a different gesture type than the first gesture, on the particular column of data;
responsive to detecting the second gesture on the particular column of data;
changing the particular selected data value to an alternative expression of the particular selected data value, the alternative expression being equivalent in value to the particular selected data value but represented in a different manner; and
changing a second particular one of the plurality of data values to an alternative expression of the second particular one of the plurality of data values;
detecting a third gesture, different from the first gesture on one of the plurality of data columns; and
responsive to detecting the third gesture, changing the expression of the particular selected data value to a previous expression.

2. The method of claim 1, further comprising:
responsive to detecting the first gesture on the particular column of data, scrolling at least one other of the plurality of data columns to change one of the selected data values.

3. The method of claim 1, wherein the display screen is a touch screen display on a portable multifunction device.

4. The method of claim 3, wherein the first gesture on the particular column of data is a substantially vertical swipe and the second gesture on the particular column of data is a tap on the touch screen display.

5. The method of claim 1, wherein the first and second gestures are finger gestures.

6. The method of claim 1, wherein the first and second gestures are gestures detected by a non-contact detector.

7. The method of claim 1, wherein the plurality of data values form a continuous loop in each column of data.

8. The method of claim 1, wherein the particular one of the plurality of selected data values is a musical note symbol of one form and the alternative expression of the particular selected data value is a musical note symbol of another form.

9. The method of claim 1, wherein the particular one of the plurality of selected data values is a number formatted as a decimal and the alternative expression of the particular selected data value is the number formatted as a percentage.

10. The method of claim 1, wherein the particular one of the plurality of selected data values is a number formatted as a decimal and the alternative expression of the particular selected data value is the number formatted as points.

11. A device, comprising:
a display screen;
a memory; and
one or more processors, the one or more processors communicatively coupled to the memory, the memory including instructions, which when executed by the one or more processors, cause the one or more processors to:
display, on a display screen, a plurality of data columns, respective columns of the plurality of data columns comprising a plurality of data values;
display a selection row that intersects the plurality of data columns to indicate a plurality of selected data values, respective data values of the plurality of selected data values corresponding to the respective columns;
detect a first gesture on a particular one of the plurality of data columns;
in response to detecting the first gesture on the particular data column, scroll the particular data column to change a particular one of the plurality of selected data values corresponding to the particular data column;
detect a second gesture, the second gesture being a different gesture type than the first gesture, on the particular column of data;
responsive to detecting the second gesture on the particular column of data;
change the particular selected data value to an alternative expression of the particular selected data value, the alternative expression being equivalent in value to the particular selected data value but represented in a different manner; and
change a second particular one of the plurality of data values to an alternative expression of the second particular one of the plurality of data values;
detect a third gesture, different from the first gesture on one of the plurality of data columns; and
responsive to detecting the third gesture, change the expression of the particular selected data value to a previous expression.

12. The device of claim 11, wherein the memory includes instructions, which when executed by the one or more processors, cause the one or more processors to:
in response to detecting the first gesture on the particular column of data scroll at least one other of the plurality of data columns to change one of the selected data values.

13. The device of claim 11, wherein the display screen is a touch screen display on a portable multifunction device.

14. A non-transitory computer readable medium that stores instructions which when performed by the computer, cause the computer to perform operations comprising:
displaying on a display screen a plurality of data columns, respective columns of the plurality of data columns comprising a plurality of data values;
displaying a selection row that intersects the plurality of data columns to indicate a plurality of selected data values, respective data values of the plurality of selected data values corresponding to the respective columns;
detecting a first gesture on a particular one of the plurality of data columns;
in response to detecting the first gesture on the particular data column, scrolling the particular data column to change a particular one of the plurality of selected data values corresponding to the particular data column;
detecting a second gesture, the second gesture being a different gesture type than the first gesture, on the particular column of data; and
responsive to detecting the second gesture on the particular column of data:
changing the particular selected data value to an alternative expression of the particular selected data value, the alternative expression being equivalent in value to the particular selected data value but represented in a different manner; and
changing a second particular one of the plurality of data values to an alternative expression of the second particular one of the plurality of data values;
detecting a third gesture, different from the first gesture on one of the plurality of data columns; and
responsive to detecting the third gesture, changing the expression of the particular selected data value to a previous expression.

15. The computer readable medium of claim 14, wherein the computer readable medium include instructions, which when performed by the computer, cause the computer to perform the operations comprising:
responsive to detecting the first gesture on the particular column of data, scrolling at least one other of the plurality of data columns to change one of the selected data values.

16. The device of claim 14, wherein the display screen is a touch screen display on a portable multifunction device.

17. A graphical user interface generated by a processor, on a device with a display screen, the graphical user interface comprising:
a plurality of data columns, respective columns of the plurality of data columns comprising a plurality of data values;
a selection row that intersects the plurality of data columns to indicate a plurality of selected data values, respective data values of the plurality of selected data values corresponding to the respective columns;
wherein the processor detects a first gesture on a particular one of the plurality of data columns;
in response to detecting the first gesture on the particular data column, the processor causes the graphical user interface to scroll the particular data column to change a particular one of the plurality of selected data values corresponding to the particular data column;

wherein the processor detects a second gesture, the second gesture being a different gesture type than the first gesture, on the particular column of data;

responsive to detecting the second gesture on the particular column of data, the processor causes the graphical user interface to:

change the particular selected data value to an alternative expression of the particular selected data value, the alternative expression being equivalent in value to the particular selected data value but represented in a different manner; and change a second particular one of the plurality of data values to an alternative expression of the second particular one of the plurality of data values;

wherein the processor is configured to detect a third gesture, different from the first gesture, on one of the plurality of data columns; and responsive to detecting the third gesture, the processor is configured to change the expression of the particular selected data value to a previous expression.

18. The graphical user interface of claim 17, further comprising:

wherein the processor causes the graphical user interface to scroll at least one other of the plurality of data columns to change one of the selected data values responsive to the processor detecting the first gesture on the particular column of data.

\* \* \* \* \*

UNITED STATES PATENT AND TRADEMARK OFFICE
CERTIFICATE OF CORRECTION

| | | |
|---|---|---|
| PATENT NO. | : 8,631,357 B2 | Page 1 of 1 |
| APPLICATION NO. | : 13/286134 | |
| DATED | : January 14, 2014 | |
| INVENTOR(S) | : Alexander Harry Little | |

It is certified that error appears in the above-identified patent and that said Letters Patent is hereby corrected as shown below:

In the Claims

Column 18, line 54, Claim 1, delete "data;" and insert --data:--, therefor

Column 19, line 54, Claim 11, delete "data;" and insert --data:--, therefor

Signed and Sealed this
Twenty-third Day of December, 2014

Michelle K. Lee
*Deputy Director of the United States Patent and Trademark Office*